United States Patent [19]

Chea, Jr.

[11] 4,387,273

[45] Jun. 7, 1983

[54] SUBSCRIBER LINE INTERFACE CIRCUIT WITH IMPEDANCE SYNTHESIZER

[75] Inventor: Ramon C. W. Chea, Jr., Monroe, Conn.

[73] Assignee: International Telephone and Telegraph Corporation, New York, N.Y.

[21] Appl. No.: 180,751

[22] Filed: Aug. 25, 1980

[51] Int. Cl.³ ............................................. H04M 19/00
[52] U.S. Cl. ................................ 179/16 F; 179/18 FA
[58] Field of Search .................. 179/16 F, 18 FA, 70, 179/77, 81 R, 170.2

[56] References Cited

U.S. PATENT DOCUMENTS 4,056,689 11/1977 Freimanis .......................... 179/16 F
4,315,106 2/1982 Chea, Jr. ............................ 179/16 F

FOREIGN PATENT DOCUMENTS 2551916 11/1976 Fed. Rep. of Germany .

Primary Examiner—Joseph A. Popek

Attorney, Agent, or Firm—John T. O'Halloran; Jeffrey P. Morris

[57] ABSTRACT

A subscriber line interface circuit is described wherein the transverse and longitudinal termination impedances may be independently controlled; and wherein the equivalent termination impedance of a subscriber line/trunk as appears to the central office can be adjusted upward or downward from a lower resistance value, with longitudinal balance (also known as the common mode rejection) being determined by the matching of feed resistors. The foregoing interface circuit is implementable as a monolithic integrated circuit having low power dissipation, improved power bandwidth requirements, and lower voltage breakdown requirements for integrated circuits; all resulting in an improved telephone line interface circuit. Voltage feedback or current feedback may be employed in a circuit to synthesize the proper ac transverse termination impedance from a known dc resistance, for example, from the feed line resistors in a telephone line circuit.

20 Claims, 7 Drawing Figures

SUBSCRIBER LINE INTERFACE CIRCUIT WITH IMPEDANCE SYNTHESIZER

BACKGROUND OF THE INVENTION

1. Field of the Invention

The present invention relates generally to telecommunication line circuitry and more specifically to circuitry for reducing the power dissipation in telephone subscriber line circuits with consequent reduction in the power requirements of the telephone central office. The present invention also relates generally to an electronic implementation of an ac transmission termination impedance.

2. Description of the Prior Art

The prior art of digital subscriber line/trunk circuitry having programmable signal generation and digitally implemented hybrid circuitry is illustrated by U.S. Pat. No. 4,161,633 of R. Treiber, assigned to the same assignee as is the present invention.

The prior art includes numerous techniques descriptive of circuitry which is designed to provide a constant line current for telephone subscriber lines. Examples of such circuitry is provided by reference to U.S. Pat. Nos. 3,035,122; 3,916,110; 4,056,691; 4,007,335 and 4,106,084. Essentially, the various circuits described in the referenced patents provide a constant or efficient line current for a telephone subscriber loop of variable length. U.S. Pat. No. 4,161,633 of Robert Treiber assigned to the same assignee as is the present invention describes a telephone line circuit providing an interface between telephone subscriber lines and a digital circuit wherein a programmable signal generator circuit senses subscriber line transmission conditions; and in response to such first subscriber line transmission conditions, derives control signals which advance the effective line matching impedance in accordance with the first subscriber line conditions. A technique for reducing power dissipation and varying the subscriber line feed circuit characteristics without varying the feed resistance value is described in copending U.S. patent application Ser. No. 098,104 filed Nov. 28, 1979 by Ramon Chea entitled Apparatus for Regulating Current Supplied To A Telephone Line; now U.S. Pat. No. 4,313,106 and is assigned to the same assignee as is the present application. While said copending application discloses a technique for regulating dc line feed current to a telephone subscriber loop, wherein power dissipation in the line feed resistors associated with the telephone subscriber interface circuit is reduced, while required loop current versus loop resistance characteristics is provided.

SUMMARY OF THE INVENTION

A subscriber line interface circuit is described wherein the transverse and longitudinal termination impedances may be independently controlled; and wherein the equivalent termination impedance of a subscriber line/trunk as appears to the central office can be adjusted upward or downward from a lower resistance value, with longitudinal balance (also known as the common mode rejection) being determined by the matching of feed resistors. The foregoing interface circuit is implementable as a monolithic integrated circuit having low power dissipation, less stringent power bandwidth requirements, and lower voltage breakdown requirements for integrated circuits; all resulting in an improved telephone line interface circuit.

A first embodiment of the invention utilizes voltage feedback and a second embodiment of the invention utilizes current feedback to synthesize the proper ac transverse termination impedance from a known dc resistance, the feed resistors in a telephone line circuit. The transverse dc resistance and the longitudinal termination impedance are determined by choice of feed resistance value. The independent control of transverse impedance is achieveable only as a result of the feedback circuitry being nonresponsive to longitudinal signals.

It is, therefore, an object of the invention to reduce power dissipation in an ac transmission termination impedance of a subscriber line/trunk interface circuit at the telephone exchange while providing a desired impedance value;

Another object of the invention is to reduce the bias voltage requirement for the telephone line circuit;

It is another object of the invention to synthesize a higher impedance from a lower impedance value by means of active feedback techniques;

The foregoing and other objects and advantages of the invention are set forth in detail in the drawings and detailed description of the preferred embodiments, wherein:

DESCRIPTION OF THE PREFERRED EMBODIMENT

Figure 1:
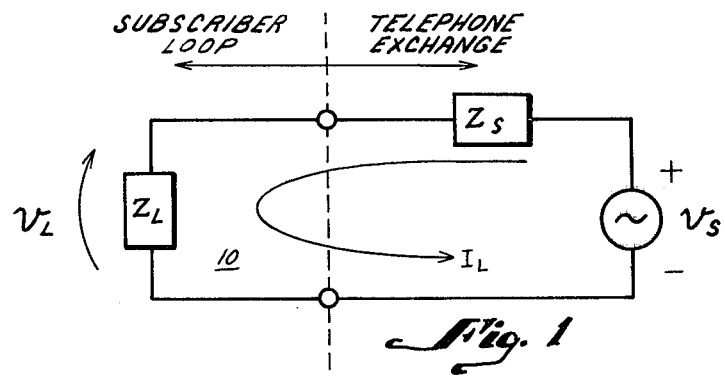
FIG. 1 is an ac transmission equivalent circuit for a telephone subscriber line circuit.

Referring now to FIG. 1, a generalized ac equivalent circuit for a subscriber line/trunk circuit is illustrated generally at 10. As will become apparent, two different circuit embodiments, one using current feedback and the other using voltage feedback will be described, both of which operate functionally to be circuit equivalents of FIG. 1. The loop circuit $i_L$ is represented as:

$$i_L = \frac{v_s}{Z_s + Z_L} \quad \text{(Eq. 1)}$$

where $v_s$ is an ac source signal, $Z_s$ is the ac transverse termination impedance, and $Z_L$ is the loop impedance.

Longitudinal balance is the degree of susceptibility to common mode interference of signals in the conductors of a balanced circuit. Longitudinal signals resulting in common mode interference may be defined as signals that appear between the lines and ground, and cause the potential of both sides of the transmission path to be changed by the same amount relative to a common ground.

The voltage across the subscriber loop, $v_L$, is represented as:

$$v_L = \frac{Z_L}{Z_L + Z_s} v_s \qquad \text{(Eq. 2)}$$

Figure 2:
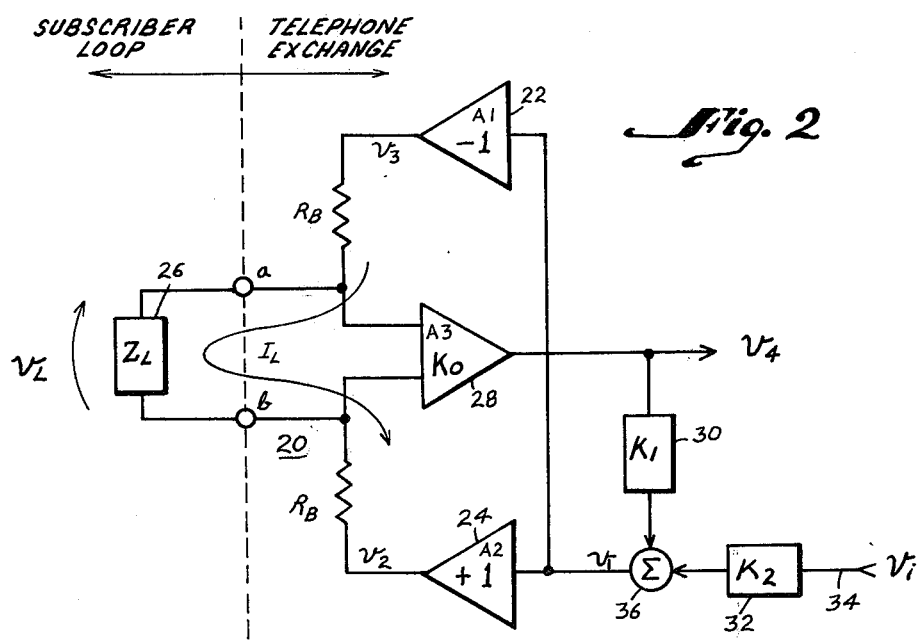
FIG. 2 is a basic network configuration for a telephone subscriber line circuit using voltage feedback control.

FIG. 2 illustrates generally at 20 a telephone subscriber loop having a loop current $I_L$ controlled by voltage feedback control. A pair of low output impedance amplifiers 22 and 24 form a differential amplifier and balanced driver for subscriber line 26. A differential high input impedance buffer amplifier 28 senses the voltage on line 26 across $Z_L$, the loop impedance, and performs a differential to single-ended signal transformation. Amplifier 28 is responsive to transverse signals only, with a transverse signal being defined as a signal which causes the potential of one side of a signal transmission path to be changed relative to the other side.

Components $K_1$ and $K_2$ at 30 and 32 are constant multipliers. Voltage $v_i$ (an analog input signal, i.e., a voice signal) on line 34 within the telephone exchange and $v_4$ (the analog signal output of amplifier 28) are coupled to a summing point 36 via impedances $K_1$ and $K_2$, respectively, to derive voltage $v_1$, which voltage $v_1$ is coupled to the inputs of differential amplifier pair 22 and 24.

Figure 3:
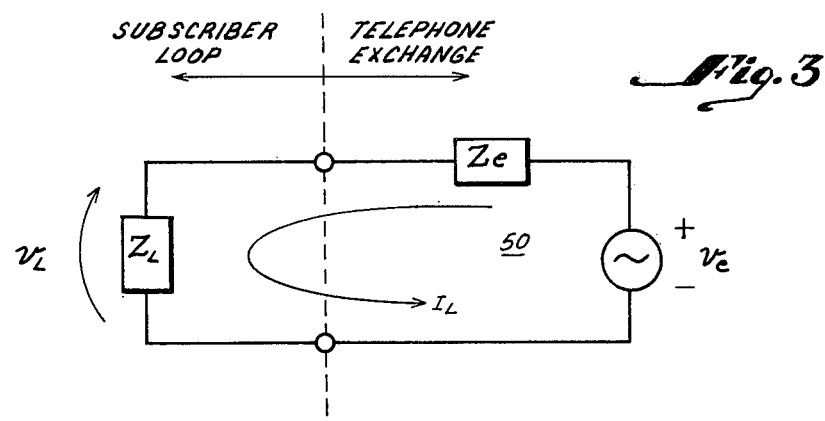
FIG. 3 is an equivalent circuit useful in describing the derivation of loop current in a telephone subscriber line circuit.

FIG. 3 illustrates generally at 50 the voltage feedbaack equivalent circuit for the loop current $I_L$ in terms of circuit parameters of FIG. 2.

$$I_L = \left(\frac{-2K_2}{1 + 2K_1K_o}\right) \left(\frac{v_i}{Z_L + \frac{2R_B}{1 + 2K_1K_o}}\right) \qquad \text{(Eq. 3)}$$

By comparing FIGS. 3 and 1, it can be seen that the circuit topology is generally the same and can be made identical by choosing circuit parameters such that $Z_e = Z_s$, and $V_s = V_e$, where $Z_e$ is a synthesized equivalent impedance, $Z_s$ is the ac transverse source termination impedance, $V_s$ is an ac source voltage, and $V_e$ is a synthesized equivalent voltage.

In terms of FIG. 2 circuit parameters:

$$Z_e = \frac{2R_B}{1 + 2K_1K_o}, \text{ and} \qquad \text{(Eq. 4)}$$

$$V_e = \frac{-2K_2 v_i}{1 + 2K_1K_o} \qquad \text{(Eq. 5)}$$

In order to synthesize a termination impedance $Z_s$ from a lower resistance value $R_B$, it is necessary that the product $K_1K_o$ be a negative number as governed by equation 4.

Figure 4:
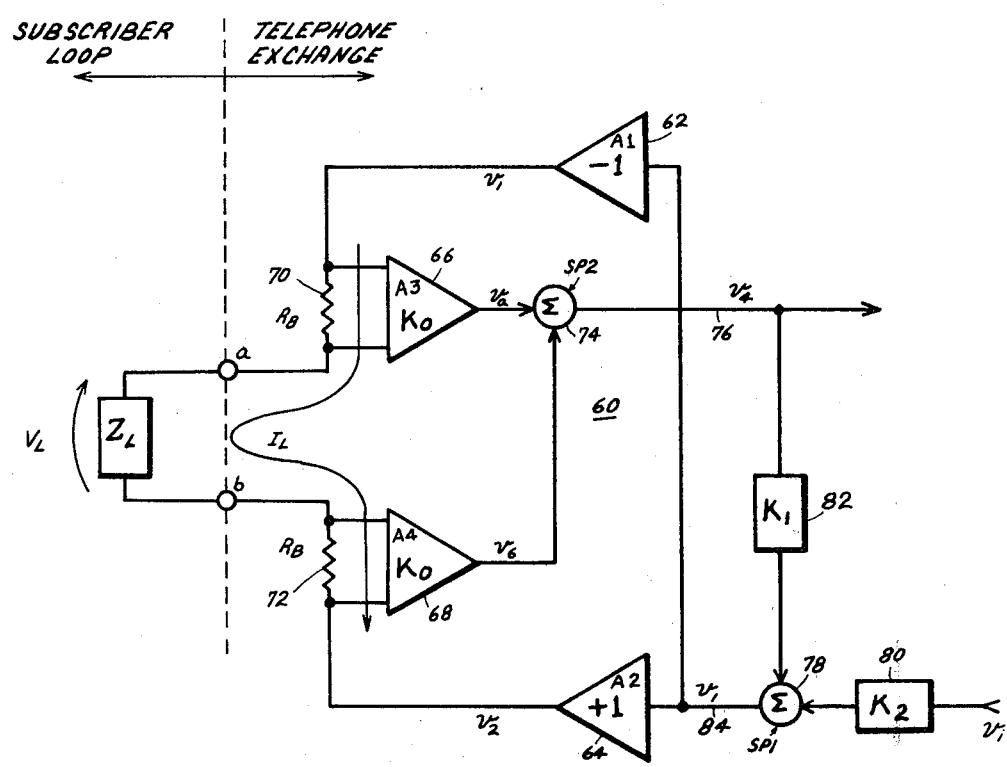
FIG. 4 is a basic subscriber line circuit configuration using current feedback control.

FIG. 4 illustrates generally at 60 a telephone subscriber loop having a loop current $I_L$ controlled by current feedback control. A differential balance driver for the subscriber line is comprised of low impedance amplifiers 62 and 64. High input impedance differential amplifiers 66 and 68 sense the voltage across $R_B$ at 70 and 72, respectively. The voltage across $R_B$ is directly proportional to the loop current $I_L$. The outputs of amplifiers 66 and 68 are summed at a summation circuit 74 to derive voltage $v_4$ on line 76, which is directly related to the subscriber loop current $I_L$. Voltage $v_4$ is variable only to transversal signals. The longitudinal signal is cancelled out at summer 74 because the output voltages $v_a$ and $v_b$ from amplifiers 66 and 68, respectively, are equal in magnitude but of opposite polarity. The voltages $v_i$ and $v_4$ are coupled to summation circuit 78 via constant multipliers 80 and 82, respectively, to produce a summation voltage $v_1$ on line 84 which constitutes a feedback signal, which is coupled to the inputs of differential driver pair 62 and 64. The loop current $I_L$ obtained from the circuit of FIG. 4 is:

$$I_L = \frac{-2K_2 v_i}{Z_L + 2R_B(1 + 2K_oK_1)} \qquad \text{(Eq. 6)}$$

The loop current $I_L$ of equation 6 can be represented by the current feedback equivalent circuit of FIG. 5, wherein $Z_e$, the synthesized impedance and $v_e$, the synthesized equivalent voltage are represented as follows:

$$Z_e = 2R_B(1 + 2K_oK_1) \qquad \text{(Eq. 7)}$$

$$v_e = -2K_2 v_i \qquad \text{(Eq. 8)}$$

Figure 5:
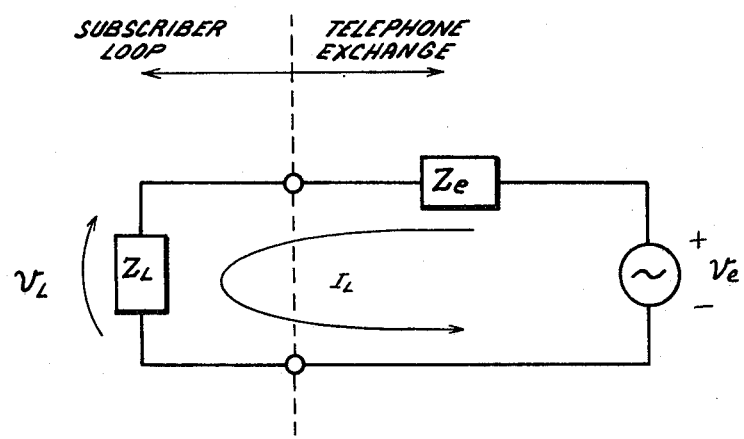
FIG. 5 is a current feedback equivalent circuit useful in defining loop current in a telephone subscriber line circuit.

By comparison of the circuits of FIGS. 5 and 1, it is apparent that they are functionally identical when the parameters of equations 7 and 8 are chosen such that:

$$z_s = Z_e \text{ and } V_s = V_e$$

In order that a termination impedance $Z_s$ can be synthesized from a lower resistance value $R_B$, it is necessary that the product $K_1K_o$ is a positive value.

From the foregoing general description, it has been illustrated that the equivalent transverse termination impedance $Z_e$ appears at the interface (a) and (b) of FIGS. 2 and 4 (the interface between, for example, the telephone central office and a telephone subscriber or trunk line) can be scaled upward or downward in accordance with equations 4 and 7, from either a lower or higher resistance $R_B$. The transverse and longitudinal termination impedances can be independently controlled. The transverse termination impedance can be adjusted without affecting the longitudinal balance of the subscriber line. The longitudinal balance is determined solely by matching of feed resistors $R_B$. Preferably, the longitudinal termination impedance is equal to half of the feed resistor $R_B$ value.

Figure 6:
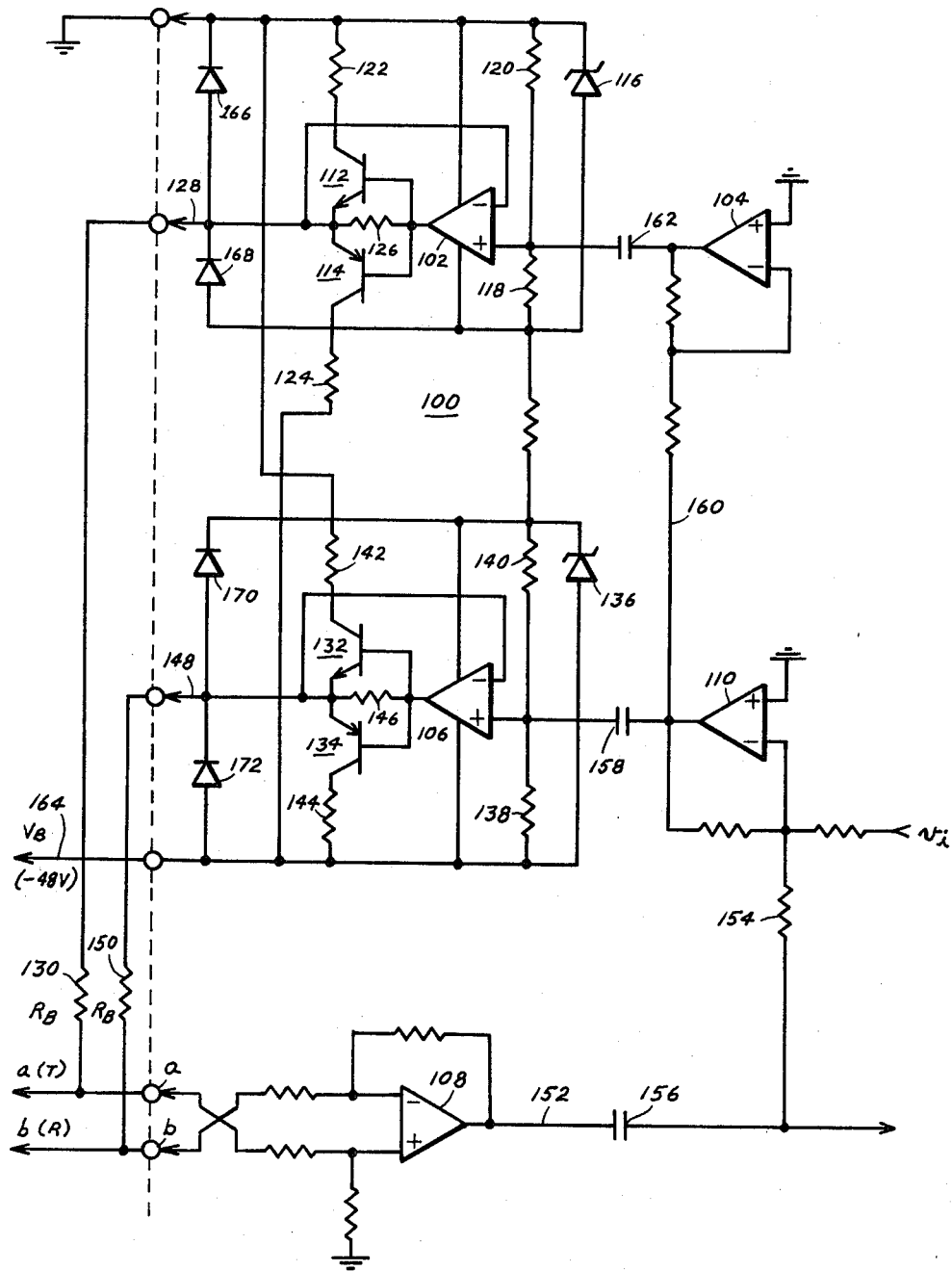
FIG. 6 is a circuit diagram of a line interface circuit in accordance with the present invention utilizing voltage feedback impedance control.

Referring now to FIG. 6, a telephone subscriber line/trunk interface circuit with voltage feedback impedance control including impedance synthesis is illustrated generally at 100. The circuit of FIG. 6 is a preferred embodiment of a specific circuit implementation of the generalized circuit of FIG. 2. Amplifiers 102 and 104 of FIG. 6 correspond to low output impedance amplifier 22 of FIG. 2; amplifier 106 of FIG. 6 corresponds to low impedance amplifier 24 of FIG. 2; amplifier 108 of FIG. 6 corresponds to differential high input impedance buffer amplifier 28 of FIG. 2; and amplifier 110 of FIG. 6 corresponds to summation circuit 36 and constant multipliers $K_1$ and $K_2$ of FIG. 2. While the circuit of FIG. 6 is illustrative of a preferred embodiment designed for operation as a telephone subscriber line circuit, other telecommunication applications requiring a synthesized impedance and power conservation are encompassed by the invention, with FIG. 6 being illustrative of one such application.

A high voltage buffer amplifier is configured from operational amplifier 102, which is configured in the unity gain follower mode with transistors 112 and 114 providing current boost, with zener diode 116 and resistors 118 and 120 providing bias to the amplifier circuit, with resistors 122 and 124 performing current limiting and protection, and with resistor 126 minimizing crossover distortion. The output of the aforedescribed high voltage buffer amplifier on line 128 is connected to the tip line of the telephone subscriber loop at point a, via feed resistance $R_B$ at 130. In like manner, another high voltage buffer amplifier is configured from operational amplifier 106, which is also configured in the unity gain follower mode with transistors 132 and 134 providing current boost, with zener diode 136 and resistors 138 and 140 providing bias to the amplifier circuit, with resistors 142 and 144 performing current limiting and protection, and with resistor 146 minimizing crossover distortion. The immediately aforedescribed high voltage buffer amplifier output on line 148 is connected to the ring line of the telephone subscriber loop at point b via another feed resistance $R_B$ at 150. An operational amplifier 108, configured in the differential high input impedance mode of operation, senses the voltage across the subscriber loop (the subscriber loop tip and ring lines) at points a and b. The output of operational amplifier 108 on line 152 is coupled to summing amplifier 110 via resistor 154 and capacitor 156. The output of summing amplifier 110 is coupled to the positive going input of amplifier 106 via capacitor 158, and to the unity gain inverting amplifier 104 via line 160. The output of amplifier 104 is coupled to the positive going input of amplifier 102 via capacitor 162. The outputs of amplifiers 110 and 104 form a differential balance pair driving a pair of high voltage, unity gain buffer amplifiers. Capacitors 162 and 158 function to decouple dc signals. Capacitor 156 functions to filter dc and to shape the frequency characteristic of the synthesized impedance. Typically, component values are selected to obtain an equivalent ac impedance of 600 ohms. A standard battery voltage $V_B$ of −48 volts appears on line 164. Conventional protective diodes 166 and 168 are provided for amplifier 102 and protective diodes 170 and 172 are similarly provided for amplifier 106.

Figure 7:
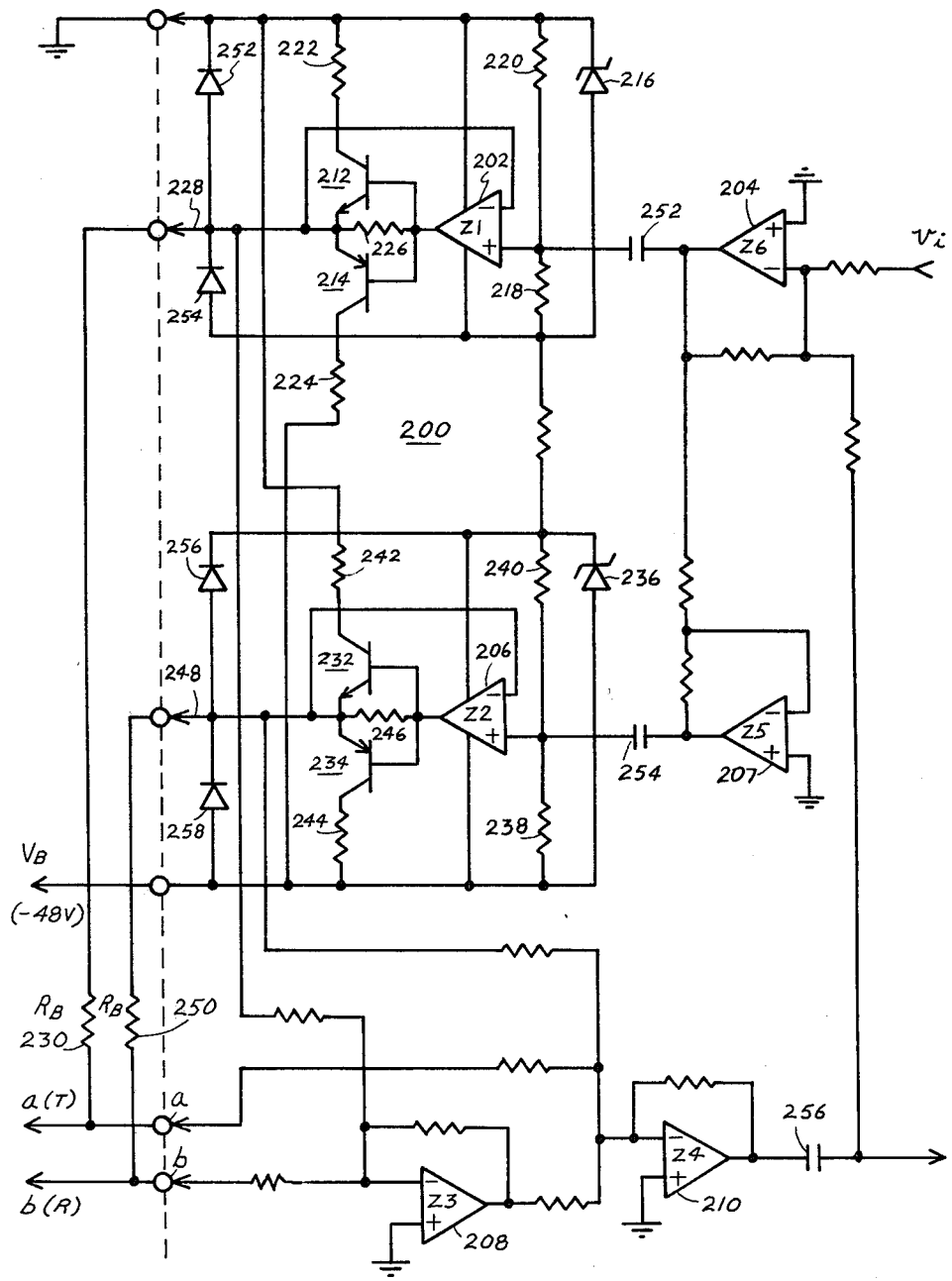
FIG. 7 is a circuit diagram of a line interface circuit in accordance with the present invention utilizing current feedback impedance control.

Referring now to FIG. 7, a telephone subscriber line/trunk interface circuit with current feedback impedance control including impedance synthesis is illustrated generally at 200. The circuit of FIG. 7 is a preferred embodiment of a specific circuit implementation of the generalized circuit of FIG. 4. Amplifiers 202 and 204 of FIG. 7 correspond to low impedance amplifier 62 of FIG. 4, amplifier 206 of FIG. 7 corresponds to low impedance amplifier 64 of FIG. 4, amplifier 207 of FIG. 7 corresponds to summation circuit 78 and constant multipliers 80 and 82 of FIG. 4, amplifiers 208 and 210 of FIG. 7 correspond to differential amplifiers 66 and 68 and summer 74 of FIG. 4. The circuit of FIG. 7 is illustrative of a preferred embodiment of the invention for operation in a telephone line circuit; however, other telecommunication applications requiring a synthesized impedance are encompassed by the invention taken as a whole.

Operational amplifier 202 comprises a high voltage buffer amplifier in the unity gain follower mode with transistors 212 and 214 providing current boost, zener diode 216 and resistors 218 and 220 providing bias to the amplifier circuit, with resistors 222 and 224 providing current limiting and protection, and with resistor 226 minimizing crossover distortion. The output of amplifier 202 on line 228 is connected to the tip line of the telephone subscriber loop at point at via feed resistance $R_B$ at 230. In like manner, another high voltage buffer amplifier is comprised by operational amplifier 206, which is also configured in the unity gain follower mode with transistors 232 and 234 providing current boost, with zener diode 236 and resistors 238 and 240 providing bias to the amplifier circuit, with resistors 242 and 244 performing current limiting and protection, and with resistor 246 minimizing crossover distortion. The high voltage buffer amplifier 206 output on line 248 is connected to the ring line of the telephone subscriber loop at point b via another feed resistance $R_B$ at 250. The foregoing operation is similar to that described with reference to FIG. 6; however, in the current feedback impedance control circuit of FIG. 7, amplifiers 208 and 210 constitute a balance, differential current sense amplifier responsive only to transverse signals. Capacitors 252 and 254 decouple dc, and capacitor 256 performs the dual function of blocking dc and shaping the frequency characteristics of the termination impedance. Typically, component values are selected to obtain an equivalent ac impedance of 600 ohms across terminals a and b. Protective diodes 252 and 254 are provided for amplifier 202 and protective diodes 256 and 258 are provided for amplifier 206.

While the present invention has been described in connection with preferred embodiments thereof, it is to be understood that additional embodiments, modifications and applications which will become obvious to those skilled in the art are included within the spirit and scope of the invention as set forth by the claims appended hereto.

I claim:

1. A line circuit for supplying a controlled loop current to a two-wire telecommunications line having a variable impedance, comprising:

first and second line feed resistance means coupled to said two-wire line;

drive means for coupling loop current through said feed resistance means to said telecommunications line;

means for sensing the voltage across each of said first and second line feed resistance means and for deriving output analog signals directly related to said loop current;

first summation circuit means having said output analog signals from said sensing means coupled thereto for cancelling longitudinal signals such that a single analog output signal representative of said loop current responsive to transversal signals is derived;

second summation circuit means for deriving a feedback control signal having coupled thereto said single analog output signal and input analog signals to couple said feedback control signal to said drive means; such that the output of said second summation circuit means is responsive to transversal signals; and whereby the ac transverse termination impedence provided by said line circuit is related to the transfer function of said feedback control signal to synthesize the impedance provided to said telecommunications line from a lower resistance value.

2. A line circuit in accordance with claim 1, wherein said controlled loop current is supplied to a two-wire analog telephone line.

3. A line circuit in accordance with claim 1, wherein said drive means comprises first and second low impedance amplifiers coupled respectively to said first and second line feed resistance means.

4. A line circuit in accordance with claim 1, wherein the magnitudes of said first and second line feed resistances are equal such that the longitudinal signal rejection is determined by the matching of said line feed resistances.

5. A line circuit in accordance with claim 1, wherein said means for sensing the voltage across each of said first and second line feed resistance means comprises:
   a pair of differential amplifiers, one of which differential amplifiers senses the voltage across said first line feed resistance means and the other of which differential amplifiers senses the voltage across said second line feed resistance means, each of said differential amplifiers having an output.

6. A line circuit in accordance with claim 5, wherein said differential amplifiers are high input impedance differential amplifiers.

7. A line circuit in accordance with claim 5, wherein said first summation circuit means for cancelling longitudinal signals includes means for constraining the outputs of said differential amplifiers to be of equal magnitude and opposite polarity.

8. A line circuit in accordance with claim 7, wherein said output analog signal is an analog voice signal, and wherein said input analog signals are other analog voice signals.

9. A line circuit in accordance with claim 8, further comprising first and second constant multipliers for adjusting the characteristics of said output analog signal and said input analog signals respectively.

10. A line circuit in accordance with claim 1, wherein the synthesized ac transverse termination impedance is of a higher impedance value than said line feed resistance means.

11. A line circuit in accordance with claim 1, wherein said line circuit is implementable upon a monolithic integrated circuit.

12. A circuit for generating a synthesized ac transverse termination impedance from an impedance value lower than the impedance of the synthesized impedance, to reduce power dissipation in a subscriber line interface circuit, comprising:
   line feed impedance means coupled to a subscriber line;
   balanced driver means for supplying regulated current to said subscriber line through said line feed impedance means;
   means responsive to transverse signals for sensing the voltage across said subscriber line and for generating an output signal; and
   feedback means including means for summing said output signal with analog input signals to derive a control signal said control signal being coupled to said balanced driver means to regulate the current output such that the ac transverse termination impedance provided for said subscriber line by said line interface circuit is greater than the impedance of said line feed impedance means.

13. A line circuit in accordance with claim 12, wherein said regulated current output is supplied to a two-wire analog telephone line.

14. A line circuit in accordance with claim 12, wherein said line feed impedance means comprises first and second resistance means and said driver means comprises first and second low impedance amplifiers coupled respectively to said first and second resistance means.

15. A line circuit in accordance with claim 14, wherein said line feed impedance means comprises first and second line feed resistances having equal magnitudes such that the longitudinal signal rejection is determined by the matching of said line feed resistances.

16. A line circuit in accordance with claim 12 wherein said means for sensing the voltage across the subscriber line comprises:
   differential amplifier means for performing a differential to single-ended signal transformation whereby said differential amplifier means is responsive to transverse signals.

17. A line circuit in accordance with claim 16, wherein said differential amplifier means is a high input impedance buffer amplifier.

18. A line circuit in accordance with claim 12, wherein said line circuit is implementable upon a monolithic integrated circuit.

19. A method for supplying a controlled loop current to a two-wire telecommunications line having a variable impedance, comprising the steps of:
   coupling loop current through first and second line feed resistance means to provide current drive to said telecommunications line;
   sensing the voltage across each of said first and second line feed resistance means for deriving output analog signals directly related to said loop current;
   cancelling longitudinal signals which may be present in said output analog signals by summing said output analog signals to derive a single analog output signal which is representative of said loop current and which is responsive to transversal signals but not to longitudinal signals;
   summing input analog signals and said single output analog signal to derive a feedback control signal which is coupled to said current drive whereby said feedback control is responsive to transversal signals and the ac transverse termination impedance provided to said two-wire telecommunications line is related to the transfer function of the feedback signal to synthesize the impedance provided to said telecommunications line from a lower resistance value.

20. A method for generating a synthesized ac transverse termination impedance from an impedance value lower than the impedance of the synthesized impedance, to reduce power dissipation in a subscriber line interface circuit, comprising the steps of:
   supplying regulated current from balanced driver means to said subscriber line through line feed impedance means;
   providing means responsive to transverse signals for sensing the voltage across said subscriber line and for generating an output signal; and
   deriving voltage feedback by summing said output signal with analog input signals to derive a control signal, said control signal being coupled to said balanced driver means to regulate the current provided to said subscriber line such that the ac transverse termination impedance provided for said subscriber line by said line interface circuit is greater than the impedance of said line feed impedance means.

* * * * *